United States Patent
Greenebaum et al.

(10) Patent No.: US 12,198,313 B2
(45) Date of Patent: Jan. 14, 2025

(54) DISPLAY MANAGER

(71) Applicant: Apple Inc., Cupertino, CA (US)

(72) Inventors: Kenneth I. Greenebaum, San Carlos, CA (US); Robert L Ridenour, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/951,047

(22) Filed: Sep. 22, 2022

(65) Prior Publication Data

US 2023/0090364 A1  Mar. 23, 2023

Related U.S. Application Data (60) Provisional application No. 63/247,748, filed on Sep. 23, 2021.

(51) Int. Cl.
  *G06T 5/92*  (2024.01)

(52) U.S. Cl.
  CPC ...................................... *G06T 5/92* (2024.01)

(58) Field of Classification Search
  CPC .... G06T 5/92; G09G 2320/0271; G09G 3/20; G09G 2320/0626; G09G 2330/021; G09G 2360/144; G09G 5/10
  See application file for complete search history.

(56) References Cited

U.S. PATENT DOCUMENTS

| | | | | |
|---|---|---|---|---|
| 2004/0036697 A1* | 2/2004 | Kim | ...................... | G06F 3/1431 345/617 |
| 2006/0066533 A1* | 3/2006 | Sato | ........................ | G09G 3/20 345/76 |
| 2006/0274026 A1* | 12/2006 | Kerofsky | ............. | G09G 3/3406 345/102 |
| 2008/0266216 A1* | 10/2008 | Choi | .................... | G09G 3/3258 345/76 |
| 2011/0069089 A1* | 3/2011 | Kopf | .................... | G09G 3/3208 345/77 |
| 2011/0267377 A1* | 11/2011 | Kim | ...................... | G09G 3/3406 345/102 |
| 2012/0268436 A1* | 10/2012 | Chang | .................. | G09G 3/3611 345/207 |
| 2013/0127701 A1* | 5/2013 | Cho | ...................... | G09G 3/3406 345/102 |
| 2013/0234606 A1* | 9/2013 | Chen | ...................... | H05B 47/11 320/101 |
| 2014/0198084 A1* | 7/2014 | Peana | .................. | G09G 3/3406 345/207 |
| 2015/0199940 A1* | 7/2015 | Qiu | ...................... | G09G 3/3406 345/691 |
| 2016/0098115 A1* | 4/2016 | Ren | ...................... | G06F 3/0412 345/174 |

(Continued)

*Primary Examiner* — Jeff Piziali
(74) *Attorney, Agent, or Firm* — BAKERHOSTETLER (57) ABSTRACT

Managing the display of an electronic device includes receiving an instruction to activate an enhanced state of the display and obtaining a current operating value of the display operating in a base state. An enhanced operating value is determined for the display based on the current operating value and a power budget allocated to the display. The enhanced operating value may be greater than the current operating value and is less than a maximum operating value of the display in the enhanced state. The display is instructed to operate in the enhanced state at the enhanced operating value.

20 Claims, 7 Drawing Sheets

(56) References Cited

U.S. PATENT DOCUMENTS

2018/0068637 A1* 3/2018 Ninan .................. G09G 3/3426
2018/0284879 A1* 10/2018 Gorbatov ................ G06F 15/76
2018/0314066 A1* 11/2018 Bell ......................... G09G 5/10

* cited by examiner

DISPLAY MANAGER

CROSS REFERENCE TO RELATED APPLICATIONS

This application claims the benefit of U.S. Provisional Application No. 63/247,748, entitled "Display Manager" filed on Sep. 23, 2021, the disclosure of which is hereby incorporated by reference herein in its entirety.

TECHNICAL FIELD

The present description relates generally to electronic devices, and more particularly to managing displays of electronic devices.

BACKGROUND

Components of electronic devices are often designed and managed based on assigned power budgets. Adherence to power budgets is particularly important for mobile electronic devices that may be relying on batteries for power at times. Compromise is often required when selecting components and/or features of components to include in an electronic device working under power budgets.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

New designs and features for electronic devices typically have associated costs in terms of power and/or performance. These costs cannot be ignored in electronic devices that utilize batteries as a power source. Enhancements in display technology provide readily apparent improvements to a user's experience with an electronic device. Such enhancements include, but are not limited to, extended dynamic range (EDR), manual user brightness control, automatic brightness adjustments, adjustments to color temperature based on time of day, and corrections to white point and illumination to compensate for ambient light and brightness. However, each of these enhancements may incur a cost in power and/or performance of the electronic device when active. For portable electronic devices that rely at least partially on battery power, the incurred costs may be difficult to justify and may result in certain enhancements being disabled to preserve battery life. Power limitations also may be associated with thermal limitations imposed on an electronic device and/or maximum sustainable current available to drive a display of the electronic device, for example.

EDR increases a display's dynamic range by using a display brightness not otherwise requested by manual settings or auto-brightness control, potentially scaling the display brightness to a maximum display brightness setting and scaling pixel values by the inverse scale. In this manner, pixels in the standard dynamic range (SDR) 0,1 may be displayed unchanged while allowing pixels from 1.0 to the scaling value to be renderable. Similarly, shifting or adjusting white point loses light that is compensated for by increasing display brightness. However, increasing display brightness increases power consumption and a power budget of the electronic devices may place limitations on the extent to which enhancement features might be employed.

Figure 1:
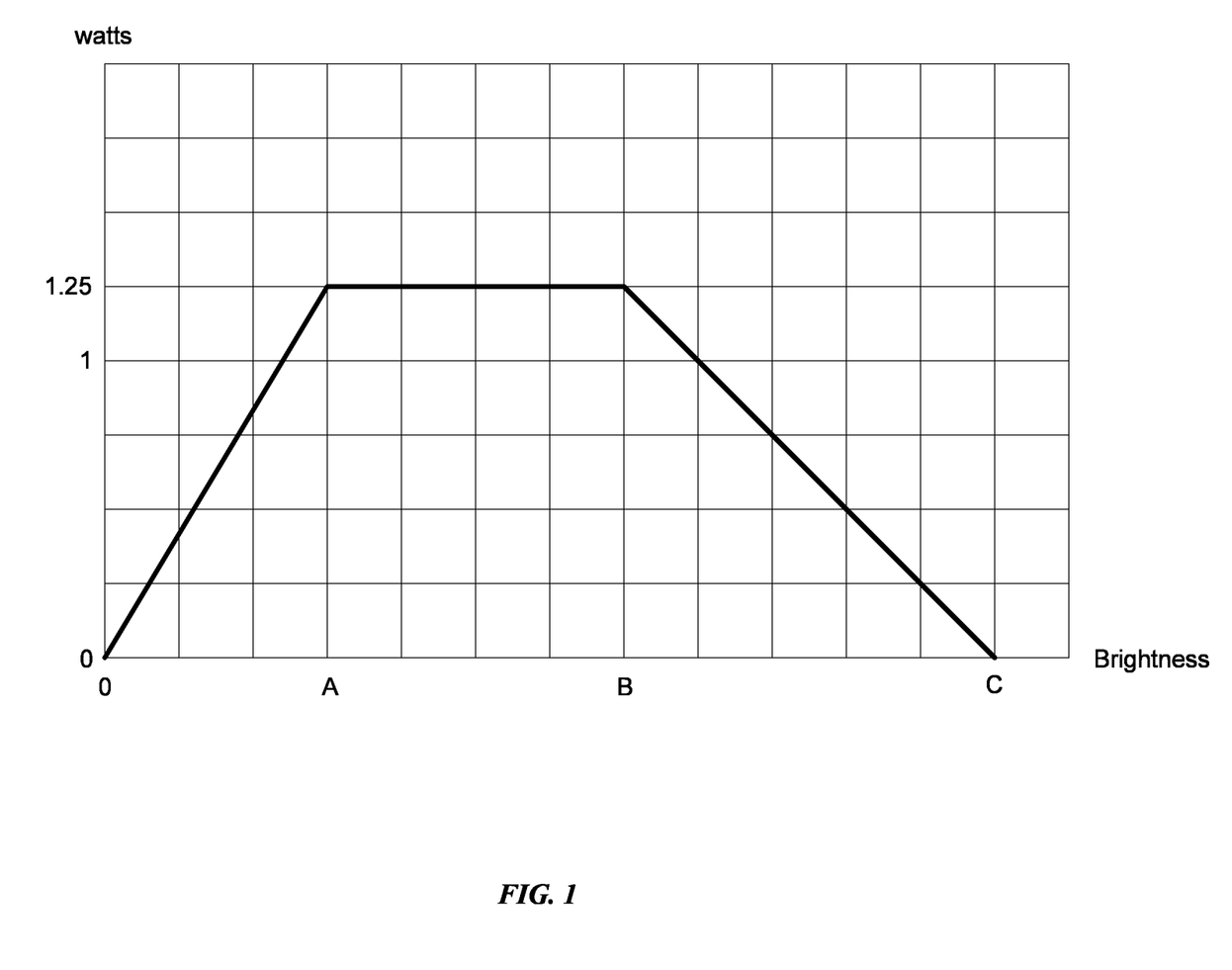
FIG. 1 is a graph illustrating the impact of a power budget on the use of backlight brightness to implement extended dynamic range on an electronic device according to aspects of the subject technology.

FIG. 1 is a graph illustrating the impact of a power budget on the use of display brightness to implement EDR on an electronic device. The graph in FIG. 1 shows a range of display brightness from 0 to a maximum C along the x-axis, and an increase in power incurred using EDR over EDR not being engaged for a given display brightness along the y-axis. A power budget of 1.25 watts is imposed in this example. As illustrated in FIG. 1, in the display brightness range from 0 to A, the additional power required by EDR increases from 0 to the power budget of 1.25 watts. This lower domain of the graph represents the region where the initial display brightness level set either by the user or automated in the system of the electronic device can be doubled to a second display brightness level without requiring more than the power budget of 1.25 watts in additional power.

In the middle domain of the graph where the initial display brightness level ranges between A and B, the power budget of 1.25 watts limits how much the display brightness level can be increased when the electronic device transitions from a base state to an enhanced state where EDR is enabled, for example. As the initial display brightness level increases from A to B, the percentage by which the initial display brightness level can be increased in the enhanced state decreases thereby reducing the visual impact of EDR on the display.

In the upper domain of the graph where the initial display brightness level ranges from B to a maximum level of C, the limits of the display itself limit the ability to double the display brightness level when enabling EDR. For example, as the initial display brightness level approaches the maximum display brightness, the available range, or headroom, of display brightness that can be added on decreases until it reaches zero when the initial display brightness equals the maximum display brightness. Accordingly, the additional power incurred with EDR being enabled will decrease to zero in correspondence with the decreasing available range of display brightness.

The subject technology proposes an automated display manager that is configured to take advantage of display enhancement technologies, such as EDR, that affect power, brightness, and/or efficiency under an allocated power budget. When transitioning from a base state where a display brightness level may be set to a nominal level by a user or the system to an enhanced state where the display enhancement technology is activated, an enhanced operating value, or display brightness level, to be used for the display is determined. The enhanced operating value may be determined based on the nominal or current display brightness level set for the display and the power budget allocated to the display. The display brightness level may be increased to the determined enhanced operating value for the display enhancement technology, which is limited by the allocated power budget, as described in more detail below.

Rather than disabling or excluding a new feature from use on an electronic device because the feature may exceed its allocated power budget, the subject technology allows the new feature to be used in the electronic device. When possible, the new feature may be used to its full extent. In those situations where use of the feature might exceed the allocated power budget, the subject technology determines an operating value under which the feature may be used within the limits of the power budget. Accordingly, the subject technology provides a compromise solution to allow the advantages of features such as display enhancement technologies to be used to the extent possible while also respecting any allocated power budgets.

Figure 2:
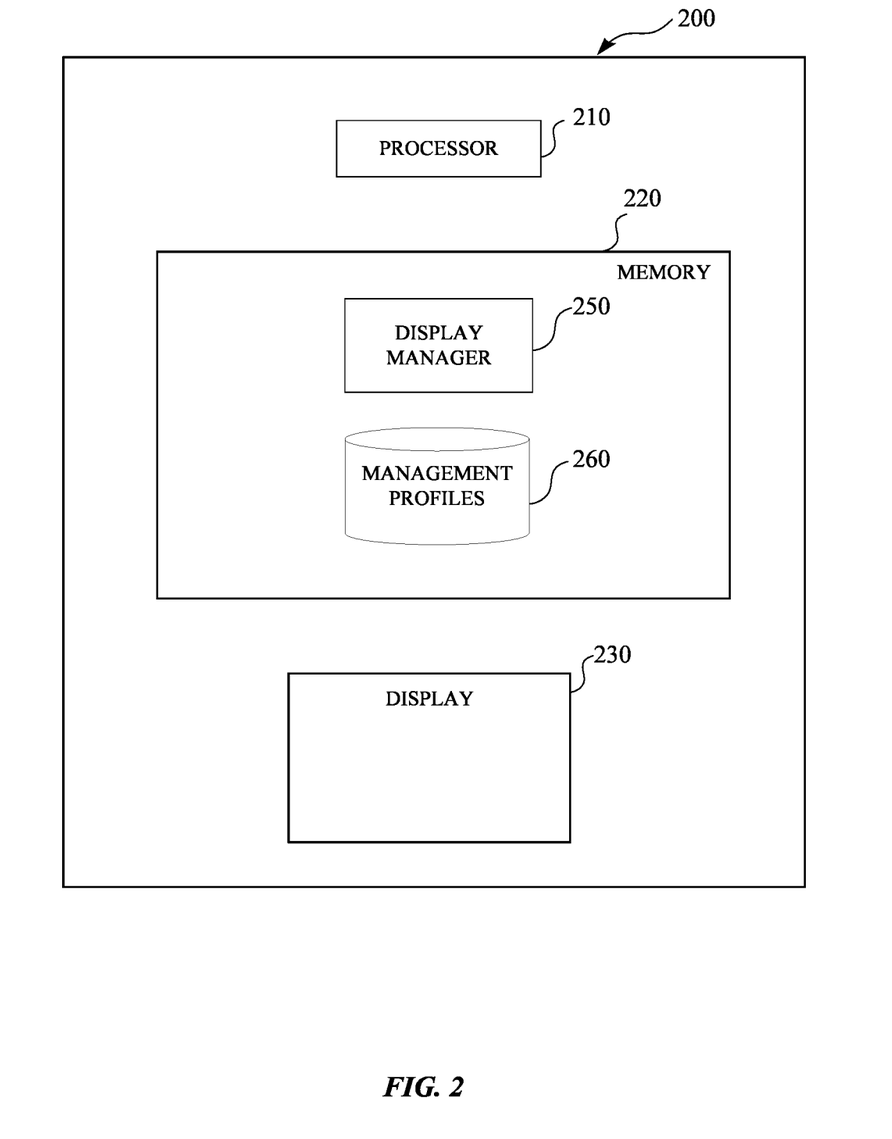
FIG. 2 is a block diagram illustrating components of an electronic device according to aspects of the subject technology.

FIG. 2 is a block diagram illustrating components of an electronic device in accordance with one or more implementations of the subject technology. Electronic device 200 may represent, but is not limited to, a portable computing device such as a laptop computer, a smartphone, a tablet device, a wearable device such as a smartwatch or a band, or any other device that is capable of executing client applications, providing access to the client applications via a graphical user interface, and includes a display, such as an OLED display. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

In the example depicted in FIG. 2, electronic device 200 includes processor 210, memory 220, and display 230. Processor 210 may include suitable logic, circuitry, and/or code that enable processing data and/or controlling operations of electronic device 200. In this regard, processor 210 may be enabled to provide control signals to various other components of electronic device 200. Processor 210 may also control transfers of data between various portions of electronic device 200. Additionally, the processor 210 may enable implementation of an operating system or otherwise execute code to manage operations of electronic device 200.

Processor 210 or one or more portions thereof, may be implemented in software (e.g., instructions, subroutines, code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Memory 220 may include suitable logic, circuitry, and/or code that enable storage of various types of information such as received data, generated data, code, and/or configuration information. Memory 220 may include, for example, random access memory (RAM), read-only memory (ROM), flash memory, and/or magnetic storage.

Display 230 represents any display technology with two-dimensional illumination. For example, in OLED displays each pixel provides its own illumination with controllable brightness. The array of OLEDs provides the two-dimensional illumination. Similarly, a liquid crystal display (LCD) may use a two-dimensional array of LEDs as a backlight where each LED provides illumination with controllable brightness. For purposes of this disclosure, both the OLED and the LCD structures noted above will be described as having two-dimensional illumination with controllable brightness.

As depicted in FIG. 2, memory 220 contains display manager 250 and management profiles 260. The subject technology is not limited to these components both in number and in type, and may be implemented using more components or fewer components than are depicted in FIG. 2. According to aspects of the subject technology, display manager 250 comprises a computer program having one or more sequences of instructions or code together with associated data and settings. Upon executing the instructions or code, one or more processes are initiated to provide a display manager configured to implement the processes described herein.

Management profiles 260 comprise data sets and/or functions used to determine a level of headroom for a given power budget based on a nominal or current display brightness level of display 230. In these examples, the level of headroom represents a multiplier by which the current brightness level can be multiplied limited either by the capabilities of the display backlight or by an allocated power budget. Accordingly, an enhanced brightness level can be determined using the level of headroom and the current brightness level. The data sets may be look-up tables or some other data structure to facilitate determining a level of headroom for a given backlight brightness level. The data points used to generate management profiles 260 may be obtained from empirical data, simulation data, etc. In other implementations, a curve may be fitted to a set of coordinates and a function determined to generate a level of headroom with a given backlight brightness level as an input value. According to aspects of the subject technology, the level of headroom is a multiple (e.g., 2) by which the nominal or current brightness level of the display backlight may be multiplied when backlight 240 of display 230 is operating in a state with EDR or another display enhancement technology active. The subject technology is not limited to these examples and other ways of representing available headroom may be used in different implementations.

Figure 3A:
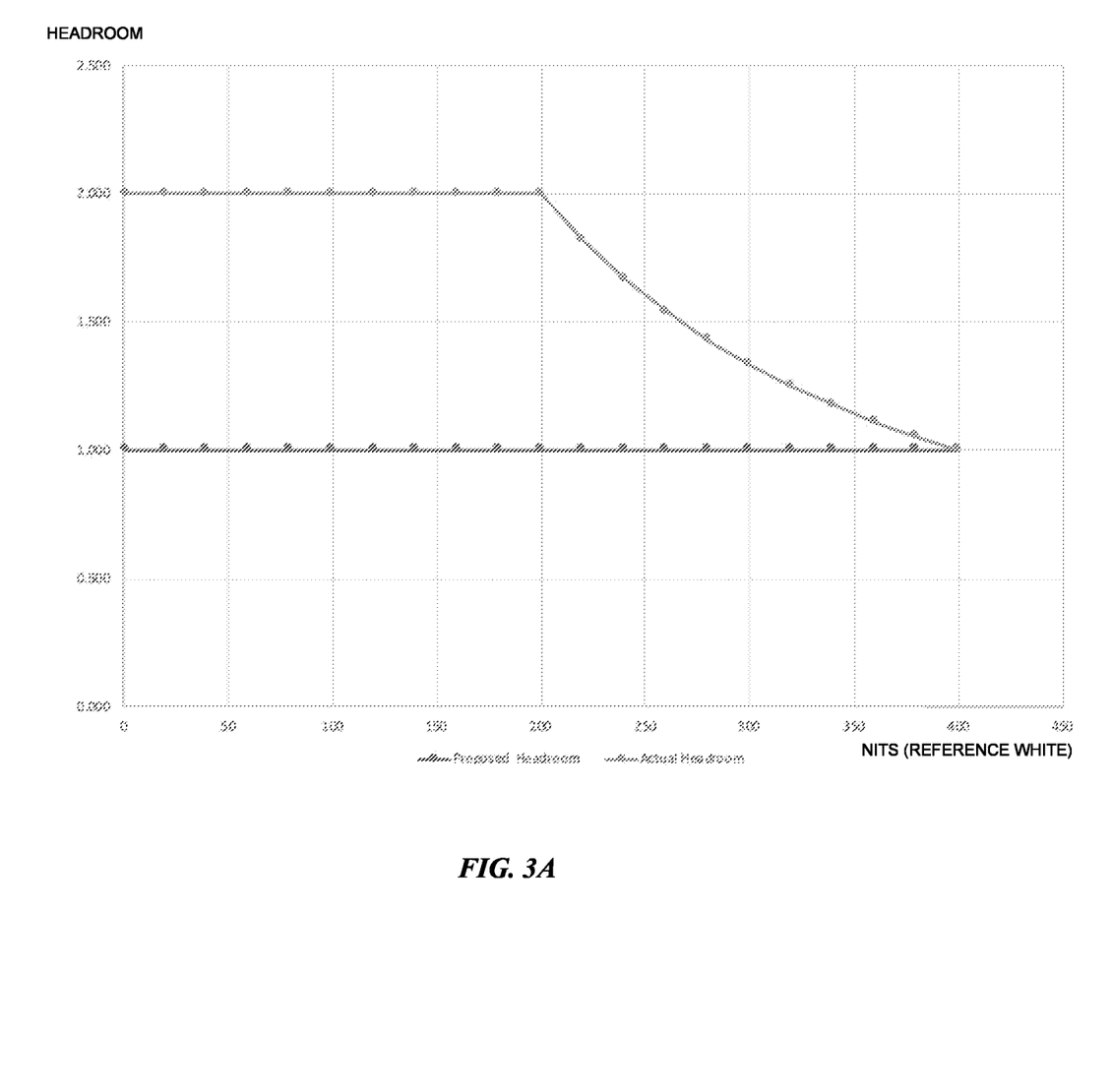
FIGS. 3A-3C are graphs of management profiles for three different power budgets according to aspects of the subject technology.
Figure 3B:
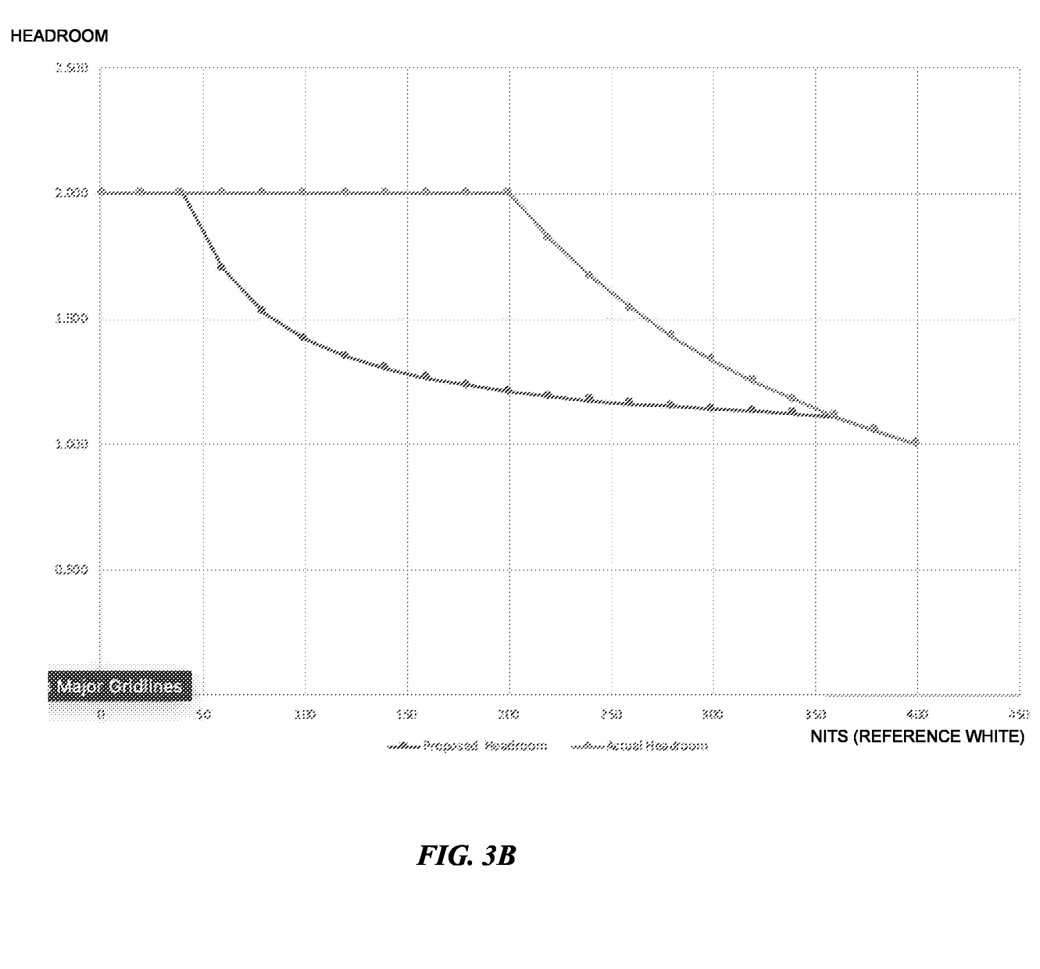
Figure 3C:
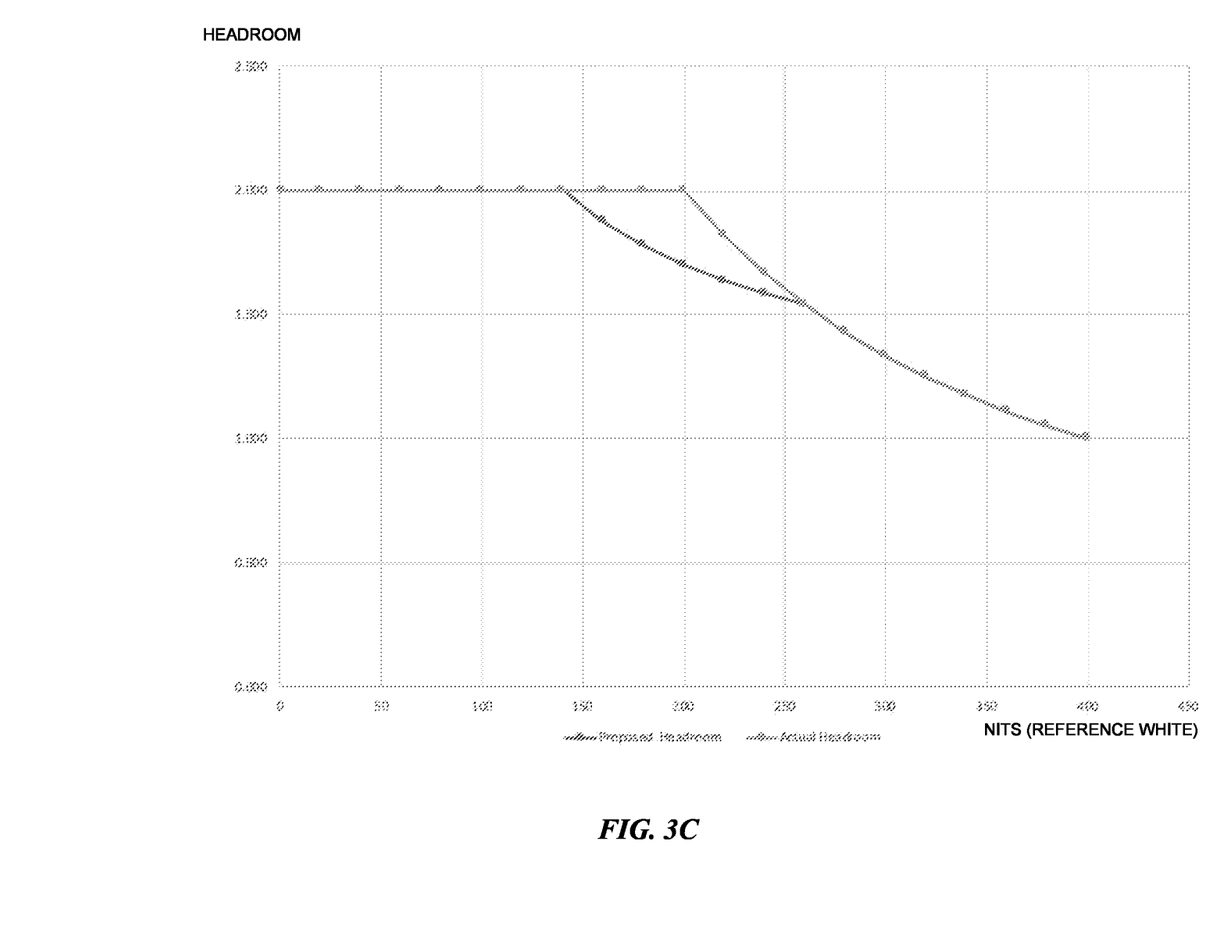

FIGS. 3A-3C are graphs of management profiles for three different power budgets. FIG. 3A shows a graph with zero power budget allocated for display enhancement. Accordingly, the proposed level of headroom remains at 1.0 throughout the range of display brightness levels starting at 0 nits up to a maximum of 400 nits. The actual headroom depicted in the graph shows possible headroom levels for the range of display brightness levels starting at 0 nits up to the maximum of 400 nits limited only by the capabilities of the display itself with no power budget limitations. As shown in the graph, EDR can double the display brightness level from between 0 nits and 200 nits. After 200 nits, the display is unable to double its brightness level since the maximum brightness level is 400 nits. Accordingly, the available headroom level decreases after 200 nits until it reaches 0 at the maximum of 400 nits.

FIG. 3B shows a graph with up to a 10.5% boost allocated as a power budget for display enhancement. As depicted in FIG. 3B, the proposed headroom curve aligns with the actual headroom curve for the first approximately 40 nits and the last approximately 40 nits of the 0 to 400 nits range of the display brightness. Between the two junction points, the proposed headroom curve remains above the 1.0 value of the zero power budget curve thereby allowing improvements in the dynamic range even if the improvements may be less since the display brightness level cannot be doubled in the middle range with the limitations of the power budget.

FIG. 3C shows a graph with up to a 57% boost allocated as a power budget for display enhancement. Relative to FIG. 3B, a greater percentage of the proposed headroom curve aligns with the actual headroom curve, meaning the greatest possible benefit from EDR is achievable for more nominal or set brightness level values. The examples depicted in FIGS. 3A-3C are only examples and are not intended to limit the scope of the subject technology. Any power budget that is assumable by the electronic device may be used without departing from the scope of the subject technology.

Figure 4:
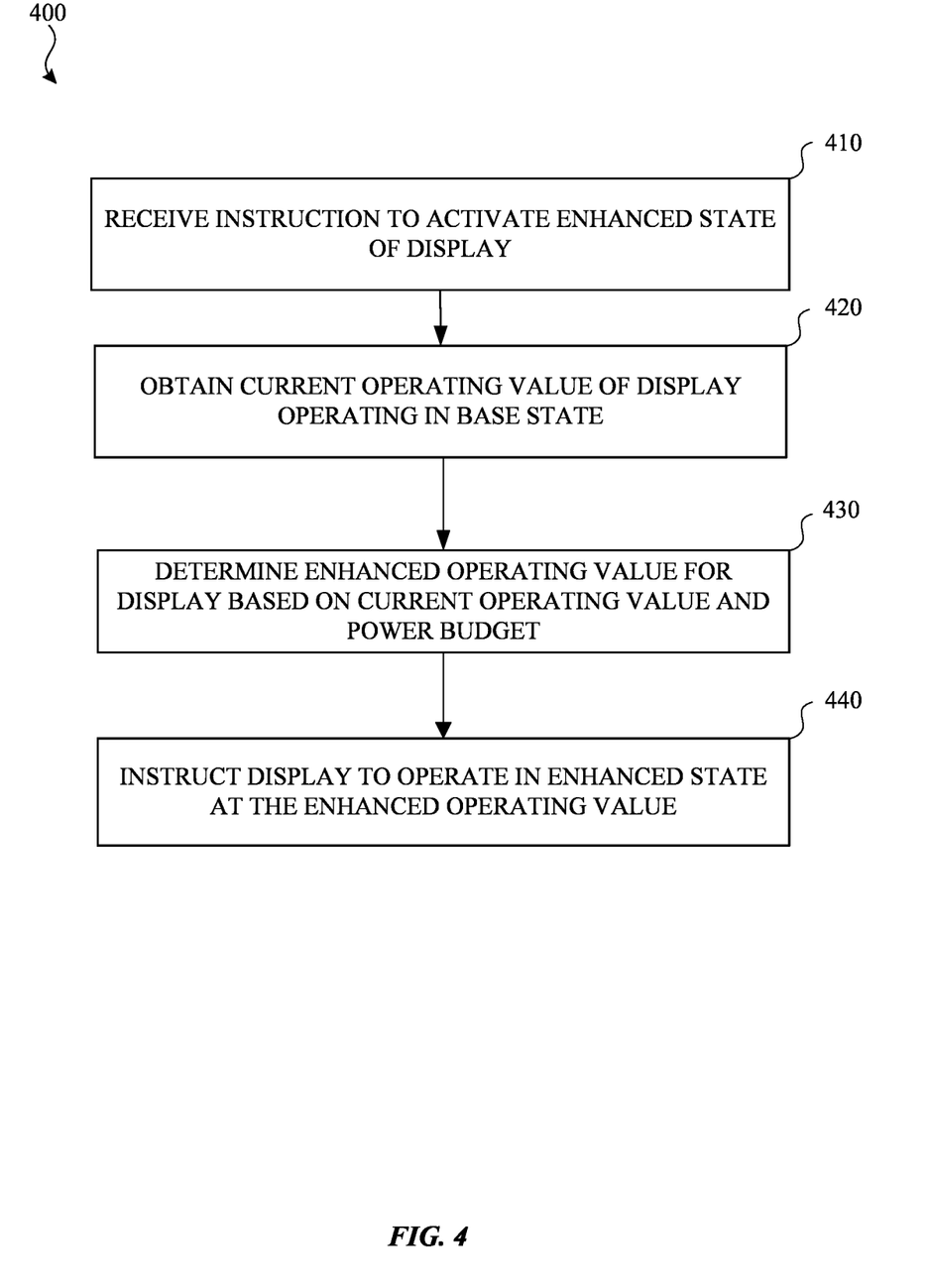
FIG. 4 illustrates an example process for managing backlight brightness levels according to aspects of the subject technology.

FIG. 4 illustrates an example process for managing display brightness levels according to aspects of the subject technology. For explanatory purposes, the blocks of the process 400 are described herein as occurring in serial, or linearly. However, multiple blocks of the process 400 may occur in parallel. In addition, the blocks of the process 400 need not be performed in the order shown and/or one or more blocks of the process 400 need not be performed and/or can be replaced by other operations.

Example process 400 may execute as a background process or daemon that monitors changes to display brightness levels made by a user or a different system component and listens for instructions to change the operating state of the display brightness for display enhancement, such as EDR for example. An instruction to activate an enhanced state of the display of an electronic device may be received (block 410). The instruction for the display to operate in the enhanced state may come from a user interaction with a user interface affordance or may be the generated by another process executing on the electronic device.

A current operating value of the display operating in a base state is obtained (block 420). The current operating value may have been set by a user interaction with a user interface affordance or may have been set by another process executing on the electronic device, such as an auto brightness detection and setting system. The process may maintain the current operating value and monitor for any changes made to the value. Alternatively, the process may obtain the current value stored in the electronic device in response to receiving the instruction to activate an enhanced state for the display.

An enhanced operating value is determined for the display based on the current operating value and a power budget allocated to the display (block 430). The enhanced operating value may be determined using a level of headroom obtained from one of the management profiles for a power budget allocated to the display and the current operating value of the display. The display is instructed to operate in the enhanced state at the enhanced operating value (block 440).

The examples described above discussed EDR as the display enhancement that was used for the management profiles and for the second state the display was operated in. The subject technology is not limited to EDR. For example, management profiles could be generated for display enhancements that shift colors on display to warmer colors based on the time of day, adjusting the display whitepoint and illumination based on quantity and quality of illumination detected in the environment in which the display is being used, as well as other display enhancements.

In addition to adjusting the display brightness for each of the foregoing display enhancements individually, the subject technology further includes developing management profiles to adjust the display brightness for two or more of these enhancements cumulatively. Accordingly, a third state may be defined for operating the display for EDR and one of the other display enhancements noted above concurrently. According to aspects of the subject technology, display enhancements may be prioritized for concurrent employment. For example, brightness corrections to display temperature and/or white point loss compensation may be prioritized over activating EDR. In this example, display temperature may be corrected first and then EDR may be activated and set based on the amount of power budget that remains after the display temperature correction is performed. Different policies with different priority lists of display enhancements are within the scope of the subject technology.

In addition, the examples described above are optimized for different power budgets that might be allocated to the display for different display enhancements. The management profiles may be developed for other operating conditions or parameters or groups of conditions or parameters such as memory usage, latency, battery versus AC power source, remaining battery charge, user-selected best quality or best battery life, etc.

According to aspects of the subject technology, the parameters for employing the display enhancements described above may be user configurable via one or more user interfaces provided on an electronic device. For example, a user of the electronic device may set or select the power budget available for display enhancements. The user also may set or select percentages of an overall power budget that are available to different respective display enhancements. In addition, the user may set or select a prioritization of display enhancements for employment on the electronic device. Combinations of these parameters may be saved as different respective policies, which may be employed under different operating conditions. For example, one policy may be used when the electronic device is plugged into an AC power source and another policy may be used when the electronic device is operating on battery power. Similarly, one policy may be used when the battery is fully charged state and another policy when the battery is in a depleted charge state. The subject technology is not limited to these examples and may be employed based on other types of operating conditions.

According to aspects of the subject technology, the power budget allocated to the display may vary based on a mode of the electronic device. For example, the electronic device may be operating in a mode, such as a gaming mode or a reference display mode, that allocates a higher power budget to the display to favor display enhancements (e.g., dynamic range, HDR fidelity) over battery life relative to a default mode of the electronic device. Similarly, the electronic device may be operating in a mode, such as an eco-mode or a maximum-battery-life mode, that allocates a lower power budget to the display to favor battery life over display enhancements relative to the default mode of the electronic device. The power budget allocated for each mode may be stored in a look-up table or other data structure accessible to the electronic device.

The mode of the electronic device may be user selectable via one or more user interfaces provided on the electronic device. Alternatively, the mode of the electronic device may be selected by an operating system on the electronic device. For example, the mode of the electronic device together with the allocated power budget may be set based on applications being executed on the electronic device. An application that has input focus, an application currently on top of the user interface, an application operating in full-screen mode, an application for particular media types, etc. may set or be used to select the mode of the electronic device.

Figure 5:
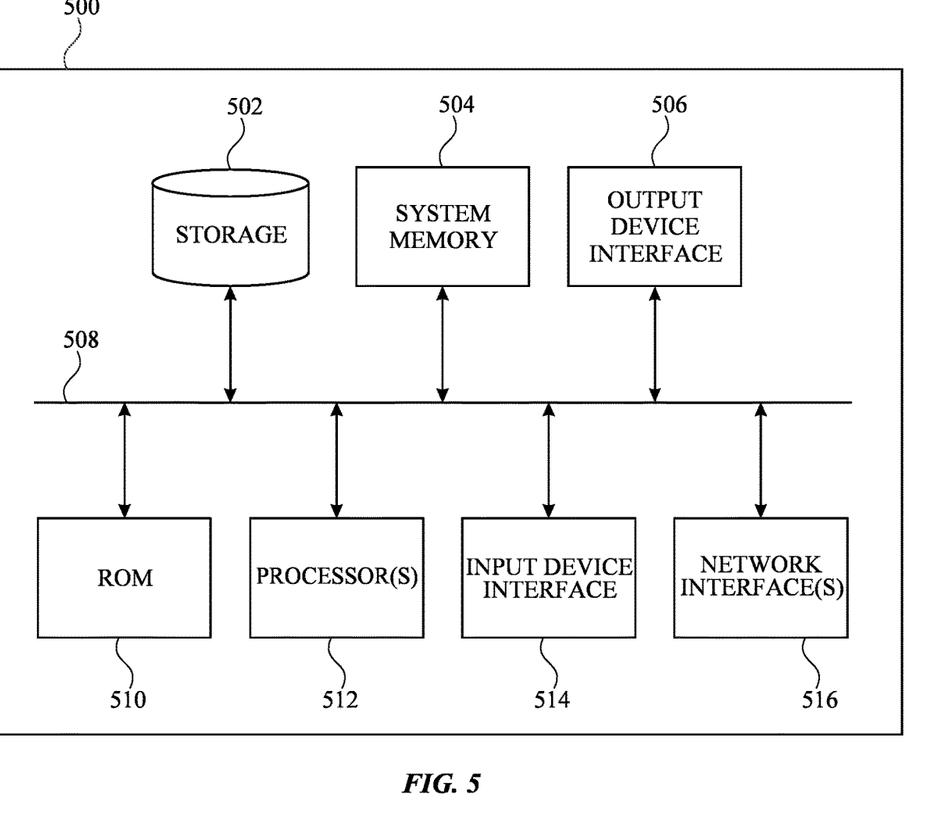
FIG. 5 illustrates an example electronic system with which aspects of the subject technology may be implemented in accordance with one or more implementations.

FIG. 5 illustrates an electronic system 500 with which one or more implementations of the subject technology may be implemented. Electronic system 500 can be and/or can be a part of, electronic device 200 shown in FIG. 2. The electronic system 500 may include various types of computer readable media and interfaces for various other types of computer readable media. The electronic system 500 includes a bus 508, one or more processing unit(s) 512, a system memory 504 (and/or buffer), a ROM 510, a permanent storage device 502, an input device interface 514, an output device interface 506, and one or more network interfaces 516, or subsets and variations thereof.

The bus 508 collectively represents all system, peripheral, and chipset buses that communicatively connect the numerous internal devices of the electronic system 500. In one or more implementations, the bus 508 communicatively connects the one or more processing unit(s) 512 with the ROM 510, the system memory 504, and the permanent storage device 502. From these various memory units, the one or more processing unit(s) 512 retrieves instructions to execute and data to process in order to execute the processes of the subject disclosure. The one or more processing unit(s) 512 can be a single processor or a multi-core processor in different implementations.

The ROM 510 stores static data and instructions that are needed by the one or more processing unit(s) 512 and other modules of the electronic system 500. The permanent storage device 502, on the other hand, may be a read-and-write memory device. The permanent storage device 502 may be a non-volatile memory unit that stores instructions and data even when the electronic system 500 is off. In one or more implementations, a mass-storage device (such as a magnetic or optical disk and its corresponding disk drive) may be used as the permanent storage device 502.

In one or more implementations, a removable storage device (such as a floppy disk, flash drive, and its corresponding disk drive) may be used as the permanent storage device 502. Like the permanent storage device 502, the system memory 504 may be a read-and-write memory device. However, unlike the permanent storage device 502, the system memory 504 may be a volatile read-and-write memory, such as random access memory. The system memory 504 may store any of the instructions and data that one or more processing unit(s) 512 may need at runtime. In one or more implementations, the processes of the subject disclosure are stored in the system memory 504, the permanent storage device 502, and/or the ROM 510. From these various memory units, the one or more processing unit(s) 512 retrieves instructions to execute and data to process in order to execute the processes of one or more implementations.

The bus 508 also connects to the input and output device interfaces 514 and 506. The input device interface 514 enables a user to communicate information and select commands to the electronic system 500. Input devices that may be used with the input device interface 514 may include, for example, alphanumeric keyboards and pointing devices (also called "cursor control devices"). The output device interface 506 may enable, for example, the display of images generated by electronic system 500. Output devices that may be used with the output device interface 506 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 5, the bus 508 also couples the electronic system 500 to one or more networks and/or to one or more network nodes, such as the content provider 112 shown in FIG. 1, through the one or more network interface(s) 516. In this manner, the electronic system 500 can be a part of a network of computers (such as a LAN, a wide area network ("WAN"), or an Intranet, or a network of networks, such as the Internet. Any or all components of the electronic system 500 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

In accordance with the subject disclosure, a method may be provided that includes receiving an instruction to activate an enhanced state of a display of an electronic device, and obtaining a current operating value of the display operating in a base state. An enhanced operating value for the display may be determined based on the current operating value and a power budget allocated to the display, where the enhanced operating value is greater than the current operating value and is less than a maximum operating value of the display in the enhanced state. The display may be instructed to operate in the enhanced state at the enhanced operating value.

The current operating value of the display operating in the base state may be a first brightness level of the display, and the enhanced operating value may be a second brightness level of the display operating in the enhanced state. The first brightness level of the display may be a user-selectable setting. The first brightness level of the display operating in the base state may be set automatically based on a light value sensed by an ambient light sensor.

Operating the display in the enhanced state may provide an extended dynamic range to an image displayed on the display relative to operating the display in the base state. Operating the display in the enhanced state may include adapting color values of the display based on environmental conditions of the display. The power budget allocated to the display may be based on a mode of the electronic device, and the mode of the electronic device may be based on an application being executed on the electronic device. The power budget may be a maximum increase in power available to the display relative to power available to the display operating in the base state.

The method may further include receiving an instruction to activate a second enhanced state of the display of the electronic device, and determining a second enhanced operating value for the display based on a second power budget allocated to the display. The second enhanced operating value may be greater than the current operating value and may be less than a second maximum operating value of the display in the second enhanced state. The display may be instructed to operate in the second enhanced state at the second enhanced operating value. Operating the electronic device in the second enhanced state may include providing an extended dynamic range to an image displayed on the display relative to operating the display in the base state and adapting color parameter values of the display based on environmental conditions of the display.

According to aspects of the subject disclosure, a non-transitory computer-readable medium may be provided storing instructions which, when executed by one or more processors, cause the one or more processors to perform operations. The operations may include receiving an instruction to activate an enhanced state of a display of an electronic device, and obtaining a current operating value of the display operating in a base state. An enhanced operating value for the display may be determined based on the current operating value and an operating condition of the electronic device, where the enhanced operating value is greater than the current operating value and is less than a maximum operating value of the display in the enhanced state. The display may be instructed to operate in the enhanced state at the enhanced operating value.

The operating condition may be a power budget representing a maximum increase in power available to the display relative to power available to the display operating in the base state. The current operating value of the display operating in the base state may be a first brightness level of the display and the enhanced operating value may be a second brightness level of the display operating in the enhanced state. Operating the display in the enhanced state may provide an extended dynamic range to an image displayed on the display relative to operating the display in the base state. Operating the display in the enhanced state may include adapting color values of the display based on environmental conditions of the display. The power budget may be based on whether the electronic device is operating on battery power. The power budget may be based on a battery charge state.

The operations may further include receiving an instruction to activate a second enhanced state of the display of the electronic device, and determining a second enhanced operating value for the display based on a second operating condition of the electronic device. The second enhanced operating value may be greater than the current operating value and may be less than a second maximum operating value of the display in the second enhanced state. The display may be instructed to operate in the second enhanced state at the second enhanced operating value. Operating the electronic device in the second enhanced state may include providing an extended dynamic range to an image displayed on the display relative to operating the display in the base state and adapting color parameter values of the display based on environmental conditions of the display.

According to aspects of the subject disclosure, an electronic device may be provided that includes a display, a memory storing instructions, and one or more processors configured to execute the instructions stored in the memory to perform operations. The operations may include receive an instruction to activate an enhanced state of a display of an electronic device, and obtain a current brightness level of the display operating in a base state. An enhanced brightness level may be determined for the display based on the current brightness level and a power budget allocated to the display, where the enhanced brightness level is greater than the current brightness level and is less than a maximum brightness level of the display in the enhanced state. The display may be instructed to operate in the enhanced state at the enhanced brightness level for the display.

The one or more processors are further configured to execute the instructions stored in the memory to receive an instruction to activate a second enhanced state of the display of the electronic device, and determine a second enhanced brightness level for the display based on a second power budget allocated to the electronic device. The second enhanced brightness level may be greater than the current brightness level and may be less than a second maximum brightness level of the display in the second enhanced state. The display may be instructed to operate in the second enhanced state at the second enhanced brightness level. Operating the electronic device in the second enhanced state may include providing an extended dynamic range to an image displayed on the display relative to operating the display in the base state and adapting color parameter values of the display based on environmental conditions of the display. The power budget allocated to the display may be based on a mode of the electronic device.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A non-transitory computer-readable medium storing instructions which, when executed by one or more processors, cause the one or more processors to perform operations comprising:
   receiving an instruction to activate an enhanced state of a display of an electronic device;
   obtaining a current operating value of the display operating in a base state;

determining an enhanced operating value for the display based on the current operating value and an operating condition of the electronic device, wherein the enhanced operating value is greater than the current operating value and is less than a maximum operating value of the display in the enhanced state, and the instruction to activate is received independent of the operating condition of the electronic device; and instructing the display to operate in the enhanced state at the enhanced operating value.

2. The non-transitory computer-readable medium of claim 1, wherein the operating condition is a power budget representing a maximum increase in power available to the display relative to power available to the display operating in the base state.

3. The non-transitory computer-readable medium of claim 2, wherein the current operating value of the display operating in the base state is a first brightness level of the display and the enhanced operating value is a second brightness level of the display operating in the enhanced state.

4. The non-transitory computer-readable medium of claim 2, wherein the power budget is based on whether the electronic device is operating on battery power.

5. The non-transitory computer-readable medium of claim 4, wherein the power budget is based on a battery charge state.

6. The non-transitory computer-readable medium of claim 1, wherein the operations further comprise:
receiving an instruction to activate a second enhanced state of the display of the electronic device;
determining a second enhanced operating value for the display based on a second operating condition of the electronic device, wherein the second enhanced operating value is greater than the current operating value and is less than a second maximum operating value of the display in the second enhanced state; and
instructing the display to operate in the second enhanced state at the second enhanced operating value.

7. The non-transitory computer-readable medium of claim 6, wherein operating the electronic device in the second enhanced state comprises providing an extended dynamic range to an image displayed on the display relative to operating the display in the base state and adapting color parameter values of the display based on environmental conditions of the display.

8. The non-transitory computer-readable medium of claim 1, wherein the operating condition of the electronic device comprises a power budget allocated to the display.

9. The non-transitory computer-readable medium of claim 8, wherein the current operating value comprises a current brightness level and the enhanced operating value comprises an enhanced brightness level.

10. The non-transitory computer-readable medium of claim 9, wherein the current brightness level of the display is a user-selectable setting.

11. The non-transitory computer-readable medium of claim 9, wherein operating the display in the enhanced state provides an extended dynamic range to an image displayed on the display relative to operating the display in the base state.

12. The non-transitory computer-readable medium of claim 11, wherein operating the display in the enhanced state comprises adapting color values of the display based on environmental conditions of the display.

13. The non-transitory computer-readable medium of claim 8, wherein the power budget allocated to the display is based on a mode of the electronic device, and wherein the mode of the electronic device is based on an application being executed on the electronic device.

14. The non-transitory computer-readable medium of claim 8, wherein the operations further comprise:
receiving an instruction to activate a second enhanced state of the display of the electronic device;
determining a second enhanced operating value for the display based on a second power budget allocated to the display, wherein the second enhanced operating value is greater than the current operating value and is less than a second maximum operating value of the display in the second enhanced state; and
instructing the display to operate in the second enhanced state at the second enhanced operating value.

15. The non-transitory computer-readable medium of claim 14, wherein operating the electronic device in the second enhanced state comprises providing an extended dynamic range to an image displayed on the display relative to operating the display in the base state and adapting color parameter values of the display based on environmental conditions of the display.

16. A method performed by one or more processors when executing instructions stored on a non-transitory computer-readable medium, the method comprising:
receiving an instruction to activate an enhanced state of a display of an electronic device;
obtaining a current operating value of the display operating in a base state;
determining an enhanced operating value for the display based on the current operating value and an operating condition of the electronic device, wherein the enhanced operating value is greater than the current operating value and is less than a maximum operating value of the display in the enhanced state, and the instruction to activate is received independent of the operating condition of the electronic device; and
instructing the display to operate in the enhanced state at the enhanced operating value.

17. The method of claim 16, wherein the operating condition is a power budget representing a maximum increase in power available to the display relative to power available to the display operating in the base state.

18. The method of claim 17, wherein the current operating value of the display operating in the base state is a first brightness level of the display and the enhanced operating value is a second brightness level of the display operating in the enhanced state.

19. A device comprising:
a non-transitory computer-readable medium storing instructions; and
one or more processors configured to execute the instructions to:
receive an instruction to activate an enhanced state of a display of an electronic device;
obtain a current operating value of the display operating in a base state;
determine an enhanced operating value for the display based on the current operating value and an operating condition of the electronic device, wherein the enhanced operating value is greater than the current operating value and is less than a maximum operating value of the display in the enhanced state, and the instruction to activate is received independent of the operating condition of the electronic device; and
instruct the display to operate in the enhanced state at the enhanced operating value.

20. The non-transitory computer-readable medium of claim 9, wherein operating the display in the enhanced state comprises adapting color values of the display based on an environment in which the display is being used and independent of changing to the enhanced brightness level.

* * * * *